United States Patent
Cloarec

(12) 
(10) Patent No.: US 6,167,708 B1
(45) Date of Patent: Jan. 2, 2001

(54) PROCESS AND APPARATUS FOR THE IN-LINE FREEZING OF PRODUCTS

(75) Inventor: Alain Cloarec, Longjumeau (FR)

(73) Assignee: L'Aire Liquide, Societe Anonyme pour l'Etude et l'Exploitation des Procedes Georges Claude, Paris Cedex (FR)

( * ) Notice: Under 35 U.S.C. 154(b), the term of this patent shall be extended for 0 days.

(21) Appl. No.: 09/369,185

(22) Filed: Aug. 6, 1999

(30) Foreign Application Priority Data

Sep. 14, 1998 (FR) .................................................. 98 11418

(51) Int. Cl.⁷ ..................................................... F25D 13/06
(52) U.S. Cl. ................................................ 62/63; 62/374
(58) Field of Search ........................................ 62/63, 374

(56) References Cited

U.S. PATENT DOCUMENTS

| | | | | |
|---|---|---|---|---|
| 5,299,426 | * | 4/1994 | Lermuzeaux | .............................. 62/63 |
| 5,454,232 | | 10/1995 | Lermuzeaux | ............................. 62/374 |
| 5,460,015 | | 10/1995 | Venetucci | ................................. 62/374 |
| 5,467,612 | | 11/1995 | Venetucci | ................................. 62/374 |

FOREIGN PATENT DOCUMENTS

| | | |
|---|---|---|
| 1 537 431 | 7/1968 | (FR) . |
| 2 708422 | 2/1995 | (FR) . |
| 1 241 061 | 7/1971 | (GB) . |
| 1 482 484 | 8/1977 | (GB) . |
| WO 93/14358 | 7/1993 | (WO) . |

* cited by examiner

*Primary Examiner*—Ronald Capossela
(74) *Attorney, Agent, or Firm*—Robert M. Schulman; Nixon Peabody LLP

(57) ABSTRACT

A process for in-line partial or complete freezing of products inside an enclosure comprising the steps of:

- introducing the products into the enclosure on a conveyor comprising an upper run and a lower run, the upper run including an upper face and a lower face;
- impregnating the conveyor with a cryogenic liquid by spraying the cryogenic liquid on the lower face of the upper run of the conveyor;
- bringing the product into contact with the conveyor and partially or completely freezing the product by heat transfer between the product and the cryogenic liquid retained in the structure of the conveyor;
- monitoring the impregnation of the conveyor;
- regulating the spraying of cryogenic liquid depending on the result of the monitoring.

An apparatus for carrying out the process is also disclosed.

14 Claims, 1 Drawing Sheet

PROCESS AND APPARATUS FOR THE IN-LINE FREEZING OF PRODUCTS

BACKGROUND OF THE INVENTION

(i) Field of the Invention

The present invention relates to a process and to an apparatus for the in-line partial or complete freezing of products (which partial freezing may be termed "crust freezing"), of the type comprising an enclosure, a conveyor for introducing the products into the enclosure and for extracting them and a refrigeration system for freezing the products, this system comprising at least a sprayer for impregnating the conveyor with a cryogenic liquid.

(ii) Description of the Related Art

The "crust freezing" of a product is an operation consisting in freezing the surface of at least one of the faces of the product in order to facilitate its preparation or subsequent handling.

The technique of crust freezing is used in particular in the food industry so as to facilitate the preparation and subsequent handling of the products (slicing, weighing, etc.)—mention may be made here, by way of illustration, of the slicing of blocks of ham and loins of pork—but it is known that these crust freezing techniques are also applicable to other food products that have to undergo a preparation step, such as salami, sausage, cheese, fish, etc.

The impregnation of the conveyor allows that face of the products in contact with it to be frozen, this having the result inter alia of eliminating any phenomenon of adhesion between the products and the conveyor. The cryogenic liquid used is generally liquid nitrogen. Reference may be made, for example, to document EP-A-576 665 which describes such food crust freezing techniques.

The crust-freezing apparatuses, and more particularly the conveyor impregnation systems, that are known at the present time usually operate in one of the following ways: either the conveyor is immersed in a bath containing the cryogenic liquid or the conveyor is sprayed with cryogenic liquid on the upper face of its upper run. The amount of cryogenic liquid which impregnates the conveyor is chosen depending on the degree to which it is desired to refrigerate the products and depending on the thickness of the latter. The conveyor may therefore be partially or completely saturated with the cryogenic liquid.

The impregnation system using a bath is complicated to implement since the conveyor has to be immersed in a bath, before or after the products have been introduced.

Spray impregnation systems also have drawbacks, since it is difficult to completely control the impregnation of the belt. This is because the amount of cryogenic liquid, pressurized or unpressurized, discharged onto the upper face of the conveyor must be sufficient for the entire run of the conveyor to be impregnated, despite the presence of the products to be crust-frozen on this same face. Moreover, it is known that a certain amount of liquid tends to percolate through the upper and lower runs of the conveyor. In addition, in all cases, with the known systems a draining phenomenon appears at the drive rollers, because of the tension being exerted at this point. There is therefore excess cryogenic liquid that it is desired in general to recover using a receptacle and by means of a pumping set, in order to be reused or removed. However, it should be noted that this recovered liquid contains fines coming from the products to be crust frozen. These fines cause the pipework of the cryogenic liquid recovery and recycling system to be fouled.

SUMMARY AND OBJECTS OF THE INVENTION

The object of the invention is especially to propose a process and an apparatus for in-line partial or complete freezing not having the abovementioned drawbacks, and in particular allowing controlled impregnation of the conveyors and making it possible to dispense with any system for recovery and recycling excess cryogenic liquid.

For this purpose, the subject of the invention is a process for the in-line partial or complete freezing of products of the aforementioned type, this process being characterized by the combined implementation of the following steps:

a) the conveyor is impregnated by spraying the cryogenic liquid onto the lower face of the upper run of the conveyor;

b) a check is made of the impregnation of the conveyor;

c) the spraying of the cryogenic liquid is regulated depending on the result of the impregnation of the conveyor;

Depending on the particular embodiments, the process according to the invention may have one or more of the following characteristics:

the cryogenic liquid is sprayed onto the lower face of the upper run of the conveyor with at least one spray nozzle located between the two runs of the conveyor and the opening of which spray nozzle is oriented toward the upper run of the conveyor;

the impregnation check makes it possible to determine the extent to which the upper run of the conveyor is not impregnated at the point where the products are extracted;

the check includes a measure of the temperature near the upper run of the conveyor;

the process furthermore includes the action of spraying the cryogenic liquid directly onto the products in a jet arranged so as to be almost perpendicular to the direction in which the products are conveyed.

The invention also relates to an apparatus for the in-line partial or complete freezing of products, of the type comprising an enclosure, a conveyor for introducing the products into the closure and for extracting them, and a refrigeration system for freezing the products, this system comprising a sprayer for impregnating the conveyor with a cryogenic liquid, the apparatus being characterized in that the sprayer for impregnating the conveyor is suitable for spraying the cryogenic liquid onto the lower face of the upper run of the conveyor and in that it includes a sensor for checking the impregnation of the conveyor and a regulator for regulating the operation of the sprayer depending on the result of the impregnation check.

The apparatus according to the invention may also include one or more of the following characteristics:

the sprayer comprises at least one spray nozzle located between the two runs of the conveyor and the opening of which spray nozzle is oriented toward the upper run of the conveyor;

the outlet of the nozzle is inclined toward the downstream end with respect to the direction of travel of the conveyor, for example at an angle close to 45° with respect to the plane of the upper run of the conveyor;

the sensor is suitable for checking the extent to which the upper run of the conveyor is not impregnated at the point where the products are extracted;

the sensor includes a temperature probe close to the upper run of the conveyor;

the refrigeration system furthermore includes a direct sprayer which comprises a nozzle spraying a jet of cryogenic liquid almost perpendicularly to the direction in which the products are conveyed;

the refrigeration system includes a mixer for mixing the atmosphere contained in the enclosure, the mixer being preferably located downstream of the sprayer.

Other features and advantages of the present invention will emerge from the following description given solely by way of illustration and with reference to the appended drawings.

DETAILED DESCRIPTION OF PREFERRED EMBODIMENTS

The present invention is also described in French Application Serial No. 98 11418, filed Sep. 14, 1998, the disclosure of which is hereby incorporated by reference.

Figure 1:
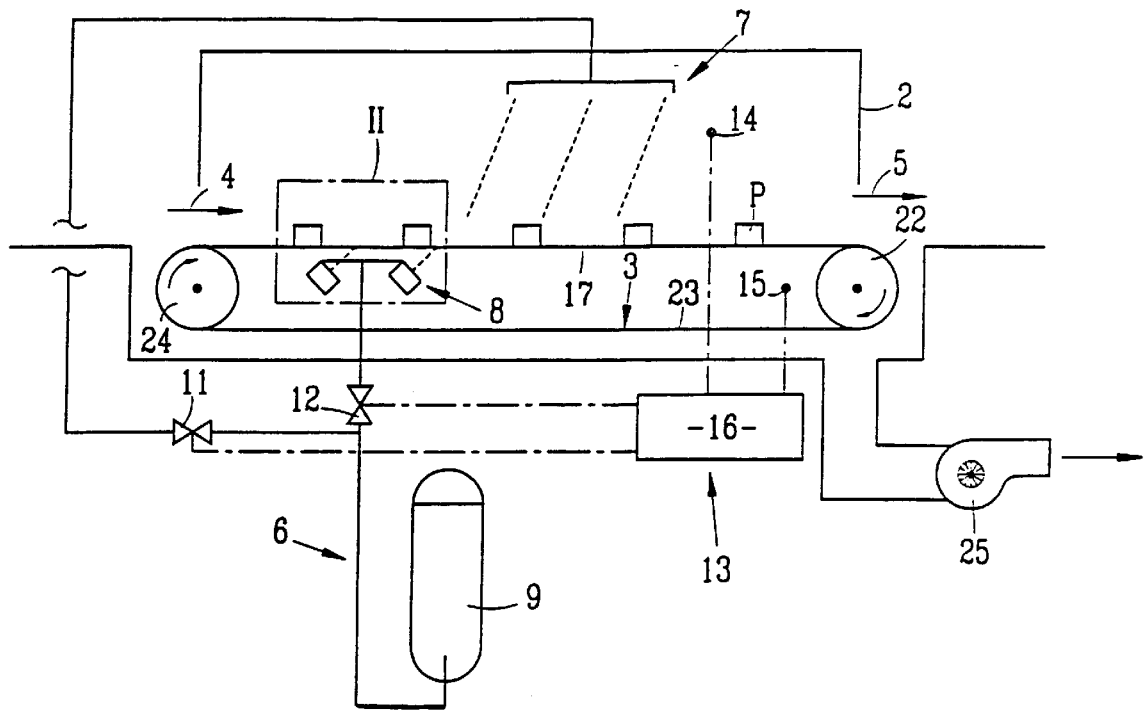
FIG. 1 shows diagrammatically a freezing apparatus according to the invention.

The apparatus 1 shown in FIG. 1 is intended for the crust freezing of products P. This apparatus is preceded by a conveyor for feeding the products P and followed by a conveyor for extracting these products, which leads to an apparatus (not shown) for the preparation of the products P. The preparation apparatus is, for example, a slicing unit for cutting up, in a defined manner, the products crust-frozen beforehand coming from the crust-freezing apparatus 1. The preparation apparatus is advantageously suitable for emitting a product-demand signal when the preparation of the previous product has been completed. Thus, the preparation apparatus may be fed continuously, thereby optimizing its efficiency.

The crust-freezing apparatus 1 essentially comprises an enclosure 2, in this case in the form of a tunnel, through which a conveyor 3 for transporting the products P to be crust-frozen passes. This conveyor 3 is formed, for example, by a belt conveyor. The conveyor is made of a porous flexible material, having a low heat capacity, so as to be able rapidly to come to thermal equilibrium with the cryogenic liquid. It may also be a belt made of a synthetic polymer material, for example TERGAL®, designed so as to have pores sufficiently small to retain the cryogenic liquid therein, for example in the form of a woven or nonwoven mat of polymer fibers.

The enclosure 2 has a parallelepipedal shape and has opposed openings 4, 5 forming an opening for introducing the products to be crust-frozen and an opening for extracting the crust-frozen products, respectively. All the walls of the enclosure 2 are in this case lined with thermal insulation so as to reduce heat transfer between the inside of the enclosure 2 and the ambient environment.

Placed inside the enclosure 2 is a refrigeration system 6 for refrigerating the products P. This system comprises a sprayer 7 for spraying the cryogenic liquid directly onto the products P and a sprayer 8 for impregnating the conveyor 3. In FIG. 1, the refrigeration system comprises a cryogenic liquid feed system which is composed of a cryogenic liquid tank 9 and feed valves 11 and 12. These valves may, for example, be proportional-action valves, or possibly cold boxes. A cold box consists of the combination of two solenoid valves, thereby allowing a choice between two types of equipment before the products P start to be introduced, and a low flow rate, suitable for the production run, this flow rate being sufficient to maintain a certain temperature inside the enclosure.

The refrigeration system 6 also includes a control system 13 for controlling the feed of cryogenic liquid to the tunnel. This control system comprises sensors 14, 15 which may be temperature sensors, as well as a regulator 16 which, especially using the data coming from the sensors, controls the feed valves 11 and 12.

The feed valve 11 of the direct sprayer 7 is, for example, controlled by the temperature probe 14 which is placed inside the enclosure 2 and determines the internal temperature of this enclosure.

The feed valve 12 of the sprayer 8 for impregnating the conveyor 3 is controlled by the sensor 15, which is suitable for determining the extent to which the upper run 17 of the conveyor 3 is not impregnated.

This sensor 15 is a temperature probe, located near the upper run 17 of the conveyor 3, at the point where the products P are extracted. The absence of impregnation of the upper run 17 of the conveyor 3, that is to say the lack of cryogenic liquid in the latter, is characterized by a rapid rise in its temperature. The regulator 16 determines, depending on the temperature, if the conveyor is still impregnated with the cryogenic liquid at the point where this temperature is measured. As a consequence, it then sends control signals to the feed valve 12 of the sprayer 8.

The sprayer 8 for impregnating the conveyor 3 comprises several spray bars 18 located between the two runs of the conveyor 3. These spray bars 18 are provided with several nozzles 19 placed close to and below the upper run 17 of the conveyor 3. These nozzles spray the cryogenic liquid obliquely forward and upward, directly onto the lower face of the upper run 17. The latter may be regarded as acting like a two-phase filter, so that the cryogenic liquid remains in the run 17 and the gas resulting from the vaporization of this cryogenic liquid passes over this run.

Figure 2:
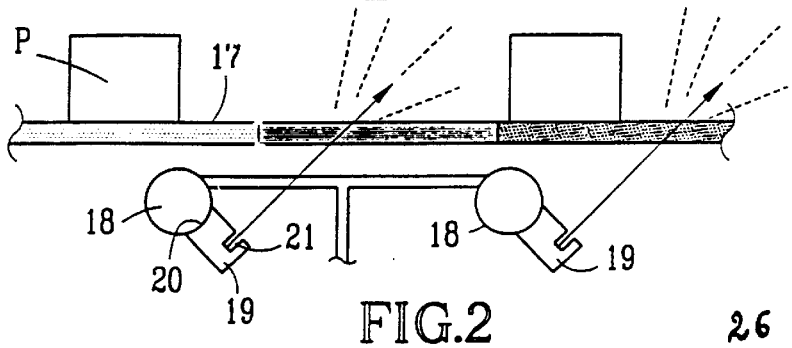
FIG. 2 shows, on a larger scale, the detail II in FIG. 1.

In FIG. 2, the gray color of the run 17 relates to its level of impregnation. The nozzles used are, for example, nozzles of the mirror type such as the "type K" nozzles sold by the company SPRAYING SYSTEM.

FIG. 2 shows the operation of this type of nozzle. This is essentially a type of nozzle in which the direction of the opening 20 for feeding cryogenic liquid into the nozzle 19 is perpendicular to the direction of the opening 21 for expelling the liquid. In FIG. 2, these nozzles are positioned in such a way that the direction in which the cryogenic liquid is sprayed makes a forward and upward angle with the direction of the upper run 17 of the conveyor 3 (in this case, an angle close to 45° C). This angle may be easily adapted depending on the requirements.

One of the advantages of this arrangement appears when cleaning the crust-freezing apparatus. This is because the cleaning liquid is able to penetrate via the ejection opening 21 of the nozzles 19 but cannot get up inside the spray bars 18. There is therefore no risk of them being blocked by the cleaning liquid.

Moreover, the sprayer 8 for impregnating the upper 17 are constructed in such a way that only the latter is impregnated. This is because the regulator 16 gives commands to the supply valve 12 in such a way that the temperature detected by the sensor 15 corresponds to a run that is not impregnated. There is therefore no draining phenomenon at the passage for the front drive wheels 22 (control of the length of impregnation). In addition, by virtue of the arrangement of the nozzles 19, there is no excess liquid dropping onto the lower run 23 of the conveyor 3. There is therefore no draining phenomenon at the rear return wheels 24 either, and it is not necessary to provide a system for recovering excess cryogenic liquid. This greatly simplifies the construction, the operation and the maintenance of the crust-freezing apparatus.

The sprayer 7 for spraying cryogenic liquid directly onto the products P comprises several spray bars 18 provided with nozzles of the so-called W type. These are flat-jet or cone-jet nozzles which have a wide angle of lateral dispersion and are fed at a high pressure. These nozzles are placed so that the flat jet is perpendicular to the direction in which the products are conveyed. Thus, the products pass in succession beneath a series of cryogenic liquid curtains, the number of curtains corresponding to the number of spray bars.

The crust-freezing apparatus 1 includes an extraction system 25 which discharges the excess cold gases (a mixture of vaporized cryogenic liquid and external air) into the atmosphere.

Figure 3:
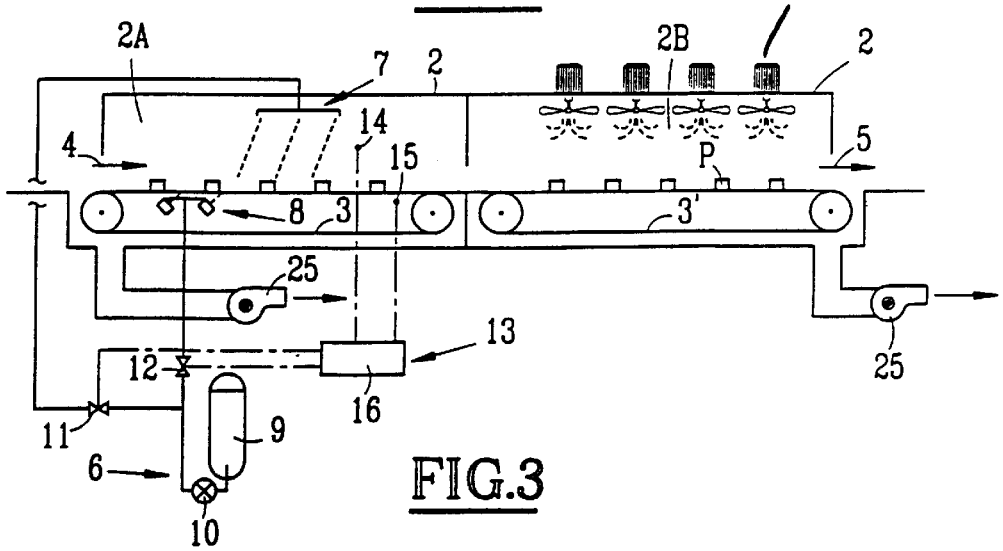
FIG. 3 is a view similar to FIG. 1 of a variant.

FIG. 3 shows a variant of the crust-freezing apparatus 1 shown in FIG. 1. In this case, the enclosure 2 has two chambers 2A and 2B, which communicate with each other and along each of which a conveyor travels—the products pass continuously from one chamber 2A to the other 2B. The first chamber 2A comprises all the elements of the crust-freezing apparatus shown in FIG. 1. The second chamber 2B is equipped with fans 26 which mix the atmosphere in this chamber.

Circulating the atmosphere in this way, which takes place at a very low temperature around the products P, promotes convection phenomena and improves the crust freezing of the products. As a variant, the mixer 26 may be in a crust-freezing apparatus having only a single chamber. They are then placed in such a way that the moving gases do not disturb the jets emitted by the direct sprayer 7.

What is claimed is:

1. A process for in-line partial or complete freezing of products inside an enclosure comprising the steps of:
    introducing the products into the enclosure on a conveyor comprising an upper run and a lower run, said upper run including an upper face and a lower face;
    impregnating the conveyor with a cryogenic liquid by spraying the cryogenic liquid on the lower face of the upper run of the conveyor;
    bringing the product into contact with the conveyor and partially or completely freezing the product by heat transfer between the product and the cryogenic liquid retained in the structure of the conveyor;
    monitoring the impregnation of the conveyor;
    regulating the spraying of cryogenic liquid depending on the result of the monitoring.

2. The process according to claim 1, comprising spraying the cryogenic liquid onto the lower face of the upper run of the conveyor with at least one spray nozzle, including an opening, which is located between the upper and lower runs of the conveyor and orienting the opening of the spray nozzle toward the upper run of the conveyor.

3. The process according to claim 1, wherein said monitoring step determines if the upper run of the conveyor is or is not impregnated near where the products are extracted.

4. The process according to claim 1 wherein said monitoring step further comprises measuring the temperature near the upper run of the conveyor.

5. The process according to claim 3 comprising regulating the spraying with cryogenic liquid so that said step of monitoring provides a result corresponding to a run that is not impregnated.

6. The process according to claim 1, further comprising the step of spraying the cryogenic liquid directly onto the products in a jet arranged so as to be almost perpendicular to the direction in which the products are conveyed.

7. An apparatus for in-line partial or complete freezing of products, comprising:
    (I) an enclosure;
    (II) a conveyor for introducing the products into the enclosure and for extracting them, said conveyor comprising an upper run and a lower run, said upper run including an upper face and a lower face;
    (III) a refrigeration system for freezing the products comprising:
        (a) a sprayer adjusted to spray a cryogenic liquid onto the lower face of the upper run of the conveyor and to impregnate the conveyor with the cryogenic fluid;
        (b) a sensor which monitors the impregnation of the conveyor by providing a result;
        (c) a regulator which regulates the operation of the sprayer depending on the result obtained by the sensor.

8. The apparatus according to claim 7, wherein said sprayer further comprises at least one spray nozzle, including an opening, located between the two runs of the conveyor, said opening of the spray nozzle being oriented towards the upper run of the conveyor.

9. The apparatus according to claim 8, wherein that the opening of the nozzle is inclined toward in a downstream direction with respect to the direction of travel of the conveyor.

10. The apparatus according to claim 9, wherein the opening of the nozzle is inclined at an angle of 45° with respect a plane formed by the upper run of the conveyor.

11. The apparatus according to claim 7, wherein said sensor monitors the extent to which the upper run of the conveyor is not impregnated at a point where the products are extracted.

12. The apparatus according to claim 7, wherein said sensor comprises a temperature probe close to the upper run of the conveyor.

13. The apparatus according to claim 7, wherein said refrigeration system further comprises a sprayer which sprays cryogenic liquid directly onto the products.

14. The apparatus according to claim 7, wherein said refrigeration system further comprises a mixer which mixes the atmosphere contained in the enclosure.

\* \* \* \* \*